United States Patent
Jung et al.

(10) Patent No.: US 11,772,273 B1
(45) Date of Patent: Oct. 3, 2023

(54) MOBILE ROBOT FOR MONITORING NETWORK AND OPERATION METHOD FOR SAME

(71) Applicant: NORMA Inc., Seoul (KR)

(72) Inventors: Hyunchul Jung, Seoul (KR); Chang Nyoung Song, Seoul (KR)

(73) Assignee: NORMA Inc., Seoul (KR)

( * ) Notice: Subject to any disclaimer, the term of this patent is extended or adjusted under 35 U.S.C. 154(b) by 0 days.

(21) Appl. No.: 18/098,703

(22) Filed: Jan. 19, 2023

(30) Foreign Application Priority Data

Jun. 17, 2022 (KR) .................. 10-2022-0074369

(51) Int. Cl.
| | |
|---|---|
| *G05B 19/04* | (2006.01) |
| *B25J 11/00* | (2006.01) |
| *B25J 9/16* | (2006.01) |
| *G05D 1/02* | (2020.01) |

(52) U.S. Cl.
CPC ............ *B25J 11/00* (2013.01); *B25J 9/161* (2013.01); *G05D 1/02* (2013.01)

(58) Field of Classification Search
CPC .. B25J 11/00; B25J 9/161; G05D 1/02; G05D 1/028; G05D 1/0285; H04W 48/16; H04W 8/005; H04W 24/08; H04W 52/245; H04W 24/00; H04W 12/06; H04W 48/08; H04W 12/08
See application file for complete search history.

(56) References Cited

U.S. PATENT DOCUMENTS

| | | | | |
|---|---|---|---|---|
| 9,800,606 | B1 * | 10/2017 | Yumer ................ | H04L 63/1425 |
| 10,492,072 | B1 * | 11/2019 | Sokolov ................ | H04L 67/12 |
| 10,659,920 | B1 * | 5/2020 | Ekambaram .......... | H04W 4/029 |
| 2006/0058062 | A1 * | 3/2006 | Bhagwat ............. | H04W 12/126 |
| | | | | 455/553.1 |
| 2012/0216037 | A1 * | 8/2012 | Simcoe ................ | H04L 63/105 |
| | | | | 713/168 |
| 2015/0078359 | A1 * | 3/2015 | Scahill ................ | H04W 12/08 |
| | | | | 370/338 |
| 2015/0119027 | A1 * | 4/2015 | Kishiyama ........... | H04W 48/18 |
| | | | | 455/434 |
| 2016/0241574 | A1 * | 8/2016 | Kumar ................ | H04L 63/12 |
| 2017/0171221 | A1 * | 6/2017 | Ho ..................... | H04L 63/1433 |
| 2017/0353859 | A1 * | 12/2017 | Idnani ................ | H04W 12/08 |
| 2018/0284800 | A1 * | 10/2018 | Su ...................... | G01S 15/88 |
| 2020/0053063 | A1 * | 2/2020 | Chaubey ............. | H04L 63/0464 |

(Continued)

FOREIGN PATENT DOCUMENTS

| | | |
|---|---|---|
| KR | 1020140057905 A | 5/2014 |
| KR | 101625437 B1 | 5/2016 |
| KR | 1020190033757 A | 4/2019 |

*Primary Examiner* — Harry Y Oh
(74) *Attorney, Agent, or Firm* — Nicholas Park

(57) ABSTRACT

The technical idea of the present invention relates to a mobile robot for monitoring a network and a method for operating the same. According to the technical idea of the present invention, a method for operating a mobile robot for detecting at least one network comprises the steps of: moving to a first location; detecting a first network in the first location; determining whether the first network is an authorized network; determining the threat of the first network when the first network is not the authorized network; and transmitting information on the first network when the first network is determined as a threat as a result of the determination of the threat.

8 Claims, 10 Drawing Sheets

(56) References Cited

U.S. PATENT DOCUMENTS

| | | | |
|---|---|---|---|
| 2021/0084058 A1* | 3/2021 | Soliman | G06N 3/045 |
| 2021/0227601 A1* | 7/2021 | Eom | H04W 12/63 |
| 2022/0103591 A1* | 3/2022 | Maturana | H04L 63/1425 |
| 2022/0225101 A1* | 7/2022 | Fellows | H04L 63/1425 |

* cited by examiner

MOBILE ROBOT FOR MONITORING NETWORK AND OPERATION METHOD FOR SAME

CROSS-REFERENCE TO RELATED APPLICATION

This Patent application claims priority to and the benefit of Korean Patent Application No. 10-2022-0074369, filed on Jun. 17, 2022, the disclosure of which is incorporated herein by reference in its entirety.

BACKGROUND

Technical Field

The present invention relates to a mobile robot for monitoring a network.

Discussion of Related Art

With the improvement of network quality and the development of Internet of Things (IoT) technology, various network devices have been deployed in homes or offices, and each network device has been used for the convenience of life by constructing a network capable of communicating with the outside. The IoT, which is one of the wireless Internet, refers to a technology for connecting various objects through wireless communication. The Internet of Things is at risk of being hacked by other devices if the Linux operating system, which is the basis of many IoT devices, does not have the right security on the device or does not have an appropriate update.

In order to determine whether a corresponding network is a device intentionally installed by a user or a threatening device capable of attacking from the outside by being disposed in a large internal space, the network devices have no choice but to determine the threat of the network by using an access point (AP) of a fixed location. Therefore, there is a problem in that a shaded area in which monitoring of a threatening device is impossible in a large space is inevitably generated.

SUMMARY

Technical Problem

The present invention is to provide a mobile robot capable of monitoring threatening network devices and a method of operating the same.

Technical Solution

According to the technical idea of the present invention, a method for operating a mobile robot for detecting at least one network comprises the steps of: moving to a first location; detecting a first network in the first location; determining whether the first network is an authorized network; determining the threat of the first network when the first network is not the authorized network; and transmitting information on the first network when the first network is determined as a threat as a result of the determination of the threat.

According to an embodiment, the determining of whether the network is the authorized network may include the steps of: collecting identification information of the first network; determining whether the identification information is included in an authorized network DB; and determining that the first network is not the authorized network when the identification information is not included in the authorized network DB.

According to an embodiment, the identification information may include at least one of a name of the first network, a security mode, and a MAC address of a device connected to the first network.

According to an embodiment, the determining of the threat of the first network may include the steps of: receiving a first signal from the first network; determining whether a predetermined pattern is included in the first signal by analyzing the first signal; and determining the first network as a threat network when the predetermined pattern is included in the first signal.

According to an embodiment, the determining of the threat of the first network may include the steps of: transmitting a second signal to the first network; receiving a third signal from the first network in response to the second signal; determining whether a predetermined pattern is included in the third signal by analyzing the third signal; and determining the first network as the threat network when the predetermined pattern is included in the third signal.

According to an embodiment, the transmitting of the information on the first network may include the steps of: acquiring location information of the mobile robot from a location sensor of the mobile robot; and acquiring the location information as information on the first network.

According to an embodiment, the method may further include: sensing a signal strength of the first network; moving from the first location to a second location where the signal strength of the first network is detected to be stronger; and obtaining location information about the second location as information about the first network.

According to an embodiment, the method may further include, when the first network is determined to be a threatening network, investigating a vulnerability of the first network based on a signal received from the first network, and cracking a password of the first network based on the vulnerability.

According to an embodiment, the method may further include, when the first network is determined to be a threatening network, investigating vulnerabilities of an access point connected to the first network and devices connected to the access point, and obtaining the vulnerability as information about the first network.

According to an embodiment, the method may further include the steps of: moving from the first location to a third location; detecting a second network at the third location; determining whether the second network is authorized; determining a threat of the second network when the second network is not the authorized network; and acquiring information on the second network when the second network is determined to be a threat as a result of determining the threat.

According to one embodiment of the present invention, a mobile robot for detecting at least one network comprises: a mobile module for moving the mobile robot; a network detector for detecting a network in the vicinity of the mobile robot; an Authorization determiner for determining whether the detected network is an authorized network; a Threat determiner for determining whether the detected network is a threat network; and a Network information acquisition module for acquiring information on the network when the detected network is the threat network.

DETAILED DESCRIPTION

Figure 1:
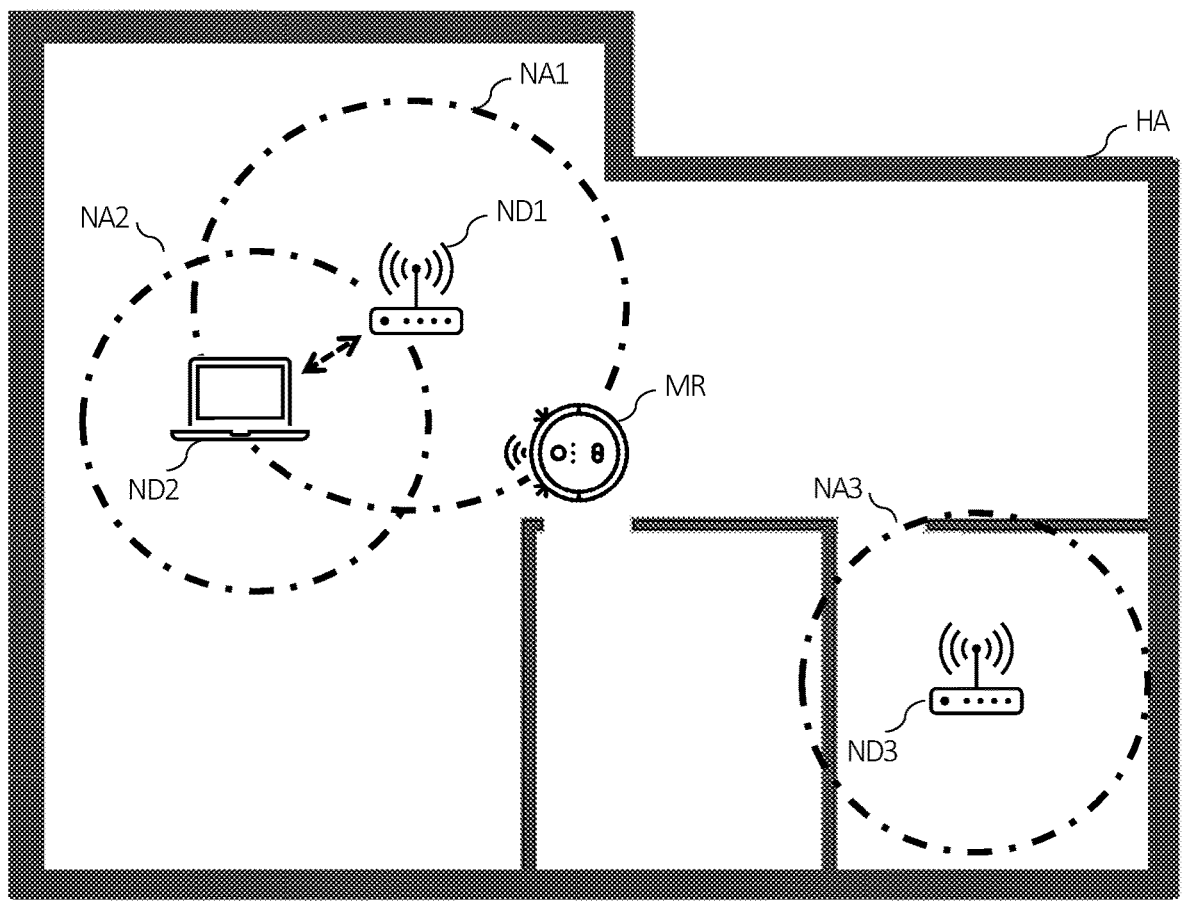
FIG. 1 is a schematic diagram illustrating a method of operating a mobile robot according to an examplary embodiment.

Hereinafter, exemplary embodiments of the present disclosure will be described in detail with reference to the accompanying drawings. Advantages and features of the present disclosure and methods of achieving them will become apparent with reference to embodiments described in detail below together with the accompanying drawings. However, the technical idea of the present invention is not limited to the following embodiments, but may be implemented in various different forms, and the following embodiments are provided to complete the technical idea of the present invention and to completely inform a person having ordinary skill in the art to which the present invention belongs of the scope of the present invention, and the technical idea of the present invention is only defined by the scope of the claims.

In adding reference numerals to elements in each drawing, it should be noted that the same elements will be designated by the same reference numerals, if possible, even though they are shown in different drawings. In addition, in describing the present invention, when it is determined that a detailed description of related known configurations or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing components of the present disclosure, terms such as first, second, A, B, (a), (b), and the like may be used. The term is used only to distinguish a component from another component, and the nature, sequence, or order of the corresponding component is not limited by the term. When it is described that a component is "engaged", "coupled", or "connected" to another component, the component may be directly engaged or connected to the other component, but it should be understood that another component may be "engaged", "coupled", or "connected" between the components.

It will be further understood that the terms "comprises" and/or "comprising" used in the present invention do not preclude the presence or addition of one or more other components, steps, operations and/or elements, as mentioned.

Components included in any one embodiment and components including a common function may be described using the same name in another embodiment. Unless stated otherwise, the description described in any one embodiment may be applied to other embodiments, and the detailed description may be omitted within a redundant range or a range that can be obviously understood by a person having ordinary skill in the art.

Hereinafter, some embodiments of the present invention will be described in detail with reference to the accompanying drawings.

Hereinafter, the present invention will be described in detail with reference to preferred embodiments of the present invention and the accompanying drawings.

FIG. 1 is a schematic diagram illustrating a method of operating a mobile robot according to an example embodiment;

Referring to FIG. 1, a mobile robot MR may monitor a network while moving around an indoor space HA, and the indoor space HA is an indoor space in which various network devices are disposed, and is not limited to an office, a home, or the like. The mobile robot MR may be expressed as a robot, but may include various devices capable of detecting a network while moving around the indoor space HA, and to this end, the mobile robot MR may include a mobile module including a motor, wheels, and the like, and a security module capable of monitoring network security.

A first network device ND1, a second network device ND2, and a third network device ND3 may be disposed in the indoor space HA. The network devices ND1, ND2, and ND3 may refer to devices that transmit and receive data using a network, and may include an access point (AP) and a wireless device connected to the AP (for example, a cellular phone, a smartphone, a laptop, a personal computer (PC), a navigation system, a personal communication system (PCS), a global system for mobile communications (GSM), a personal digital cellular (PDC), a personal handy phone system (PHS), a personal digital assistant (PDA), an international mobile telecommunication (IMT)-2000, a code division multiple access (CDMA)-2000, a W-code division multiple access (W-CDMA), a wireless broadband Internet (Wibro), a smart pad, a tablet PC, a tablet PC, a PC, IoT device, and a watch. In FIG. 1, the first network device ND1 and the third network device ND3 are APs, and the second network device ND2 is a wireless device connected to the first network device ND1, but the technical idea of the disclosure is not limited thereto.

Further, the network includes a Local Area Network (LAN), a Wide Area Network (WAN), the World Wide Web (WWW), a wired/wireless data communication network, a telephone network, a wired/wireless television communication network, 3G, 4G, 5G, 3rd Generation Partnership Project (3GPP), 5th Generation Partnership Project (5GPP), Long Term Evolution (LTE), World Interoperability for Microwave Access (WIMAX), Wi-Fi, the Internet, a Local Area Network (LAN), a Wireless Local Area Network (Wireless LAN), a Wide Area Network (WAN), a Personal Area Network (PAN), a Radio Frequency (RF), a Bluetooth network, a Near-Field Communication (NFC) network, a satellite broadcasting network, an analog broadcasting network, a Digital Broadcasting (DMB) network, and the like, but is not limited thereto.

The first network device ND1 may transmit and receive data to and from the devices included in the first network area NA1, the second network device ND2 may transmit and receive data to and from the devices included in the second network area NA2, and the third network device ND3 may transmit and receive data to and from the devices included in the third network area NA3. The first network area NA1 to the third network area NA3 may be distributed in different areas according to the locations of the network devices ND1 to ND3, and the mobile robot MR may monitor the network devices ND1 to ND3 while moving around the indoor space HA using the mobile module.

The first network device ND1 to the third network device ND3 may be any one of a network authorized by a manager who has an access right to the indoor space HA and a network not authorized by the manager. In an embodiment, the mobile robot MR may determine whether the network devices ND1 to ND3 are networks authorized by a manager while moving through the indoor space HA. Also, the first network device ND1 to the third network device ND3 may be any one of a network device with an attacking threat and a network device without the attacking threat, which is disposed to leak various data of the indoor space HA to the outside. In an embodiment, if the mobile robot MR is in an unauthorized network, the mobile robot MR may determine whether a network device is a network device in which an attacking threat exists, and when the mobile robot MR is in the attack threat state, the mobile robot MR may respond to the attacking threat.

Due to the development of network performance and the development of IoT technology, as a wireless network module is inserted into various electronic devices, wireless devices that are not recognized by a manager are disposed in the indoor space HA, and among them, threatening wireless devices leak various data that may be acquired in the indoor space HA to the outside, thereby exposing a problem of privacy of a manager. However, in the related art, a shaded area for network security is inevitably generated by monitoring network security using only a fixed device (AP, or the like). In the example of FIG. 1, the first network device ND1 may perform network security monitoring for the second network device ND2 located in the first network area NA1, but may not perform network security monitoring for the third network device ND3 not located in the first network area NA1.

On the other hand, the mobile robot MR may perform network security monitoring while moving using the network security module, and accordingly, not only the first network device ND1 and the second network device ND2 which are currently located close to each other but also the third network device ND3 located at a corner may perform network security monitoring. According to the technical idea of the present disclosure, the mobile robot MR may move in the indoor space HA and monitor a wide area by performing network security monitoring, and may minimize a shaded area for network security.

Although FIG. 1 illustrates an example in which three network devices ND1, ND2, and ND3 are disposed in the indoor space HA, the technical idea of the present disclosure may be applied to an embodiment in which more or less than three network devices are disposed, and FIG. 1 illustrates an example in which the mobile robot MR performs network security monitoring on the indoor space HA, but the mobile robot MR according to the technical idea of the present disclosure may perform network security monitoring even in an outdoor space.

Figure 2:
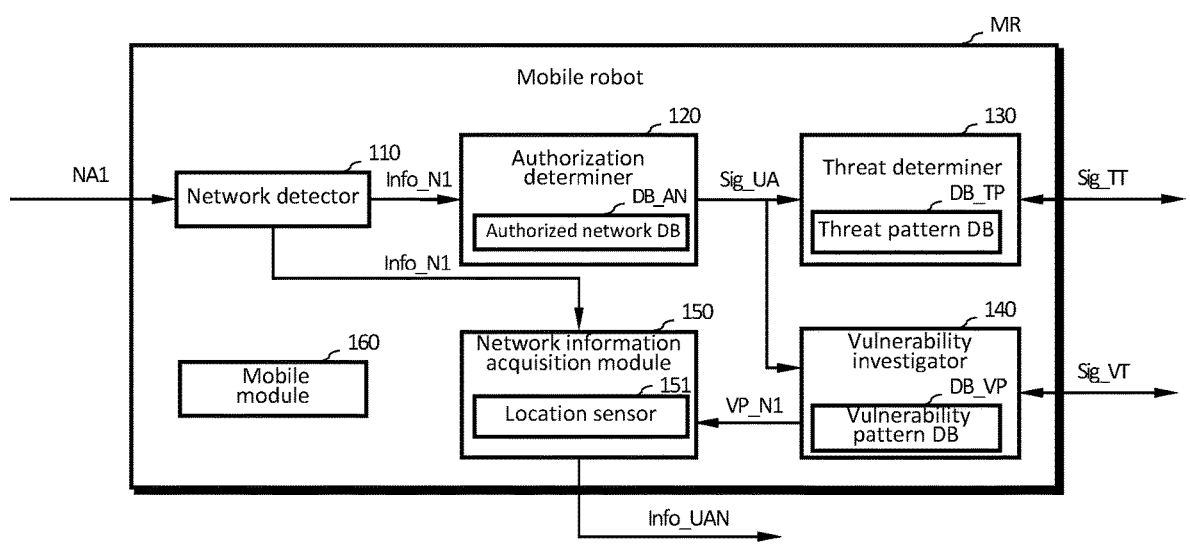
FIG. 2 is a block diagram illustrating a mobile robot according to an exemplary embodiment.

FIG. 2 is a block diagram illustrating a mobile robot according to an exemplary embodiment.

Referring to FIG. 2, the mobile robot MR may include a network detector 110, an Authorization determiner 120, a Threat determiner 130, a mobile module 160, a Network information acquisition module 150, and a Vulnerability investigator 140. In one example, the network detector 110, the Authorization determiner 120, the Threat determiner 130, the Network information acquisition module 150, and the Vulnerability investigator 140 may configure the network security module described above with reference to FIG. 1.

In the present specification, an operation performed by each component included in the mobile robot MR may be an operation actually performed by a processor of the mobile robot MR using an application program embedded in a storage device of the mobile robot MR The storage device may include a non-volatile memory, a volatile memory, a flash memory, a hard disk drive (HDD), a solid state drive (SSD), or the like. In addition, the processor may include at least one of a Central Processing Unit (CPU), a Graphic Processing Unit (GPU), a Neural Processing Unit (NPU), a RAM, a ROM, a system bus, and an application processor.

The network detector 110 may detect the first network area NA1, and may generate first network device information Info_N1 by analyzing a signal transmitted by the first network device ND1 in the first network area NA1. The first network device information Info_N1 is various types of information capable of identifying a network, and may include a network name, a network identifier (e.g., a Service Set Identifier (SSID)), an identifier (e.g., a MAC address) of a network device, a type of the network device, and a security mode of the network device.

The Authorization determiner 120 may determine whether the first network device ND1 is a network device authorized by a manager based on the first network device information Info_N1 generated by the network detector 110, and may generate an unauthorized signal Sig_UA when the first network device ND1 corresponds to an unauthorized network. In an embodiment, the authorized network DB DB_AN may include information (e.g., a network name, a SSID, or a MAC address) about a network authorized by a manager, and the Authorization determiner 120 may determine whether the first network device ND1 is an authorized network device based on whether information corresponding to the first network device ND1 is included in the authorized network DB DB_AN. In addition, when receiving information on the authorized network from the manager terminal, the Authorization determiner 120 may update the authorized network DB DB_AN based on the received information.

The Threat determiner 130 may determine a threat to the first network device ND1 in response to the unauthorized signal Sig_UA. In the present specification, the threat refers to whether a network device has a purpose of acquiring data by attacking a network of an administrator or disturbing the network of the administrator by using a malicious code or the like, and the threatening network may have a tendency to attack the network of the administrator. In an embodiment, the Threat determiner 130 may determine the threat to the first network device ND1 using the threat pattern DB DB_TP. The threat pattern DB DB_TP may include information about a data pattern of a threat network, and the Threat determiner 130 may receive a threat test signal Sig_TT from the first network device ND1 and determine a threat to the first network device ND1 based on whether the threat test signal Sig_TT includes the data pattern included in the threat pattern DB DB_TP. In an embodiment, the Threat determiner 130 may update the threat pattern DB DB_TP using the threat pattern obtained from the predetermined web site.

The Vulnerability investigator 140 may investigate the vulnerability of the first network device ND1 in response to the unauthorized signal Sig_UA. In the present specification, the vulnerability may mean a weakness used for lowering the information guarantee of the wireless device by the threatening network, and the Vulnerability investigator 140 may attack the vulnerability to neutralize the threatening network device. In an embodiment, the Vulnerability investigator 140 may investigate the vulnerability of the first network device ND1 using the vulnerability pattern DB DB_VP. The vulnerability pattern DB DB_VP may include information on a data pattern corresponding to a vulnerability of a threatening network, the Vulnerability investigator 140 may receive the vulnerability test signal Sig_VT from the first network device ND1 and may investigate a vulnerability of the first network device ND1 based on whether the vulnerability test signal Sig_VT includes a data pattern included in the vulnerability pattern DB DB_VP, and in an embodiment, the Vulnerability investigator 140 may neutralize the first network device ND1 by cracking the investigated vulnerability. In an embodiment, the Vulnerability investigator 140 may update the vulnerability pattern DB DB_VP using a vulnerability pattern obtained from a predetermined web site.

The Network information acquisition module 150 may collect various pieces of information about the threatening network (for example, first network device information Info_N1, first vulnerability information VP_N1, and location information of the mobile robot MR) and transmit the collected threat network information Info UAN to the manager terminal. In an example, the threat network information Info UAN may include a name of the first network device ND1, a SSID, an MAD address, first vulnerability information VP_N1, and location information of the mobile robot MR, and the location information MR among the threat network information Info UAN may be collected by the location sensor 151.

The mobile module 160 may change the location of the mobile robot MR To this end, the mobile module 160 may include a motor and a wheel, and may move the mobile robot MR based on an instruction of the processor so that the mobile robot MR may perform network security monitoring. Accordingly, the mobile robot MR may perform network security monitoring for a wide area. In an embodiment, the mobile module 160 may move the mobile robot MR in a direction in which the strength of the network increases, which will be described in detail later in FIG. 8.

According to the technical idea of the present disclosure, the mobile robot MR may perform network security monitoring including a series of processes of determining whether a network device is authorized/unauthorized, determining a threat, investigating a vulnerability, acquiring network information, and the like moving, and accordingly, may discover a network that may pose a threat to an administrator in a wide range of space and transmit information about the network to the administrator. As a result, a high level of security for the home network may be achieved by rapidly discovering and processing a threatening network.

Figure 3:
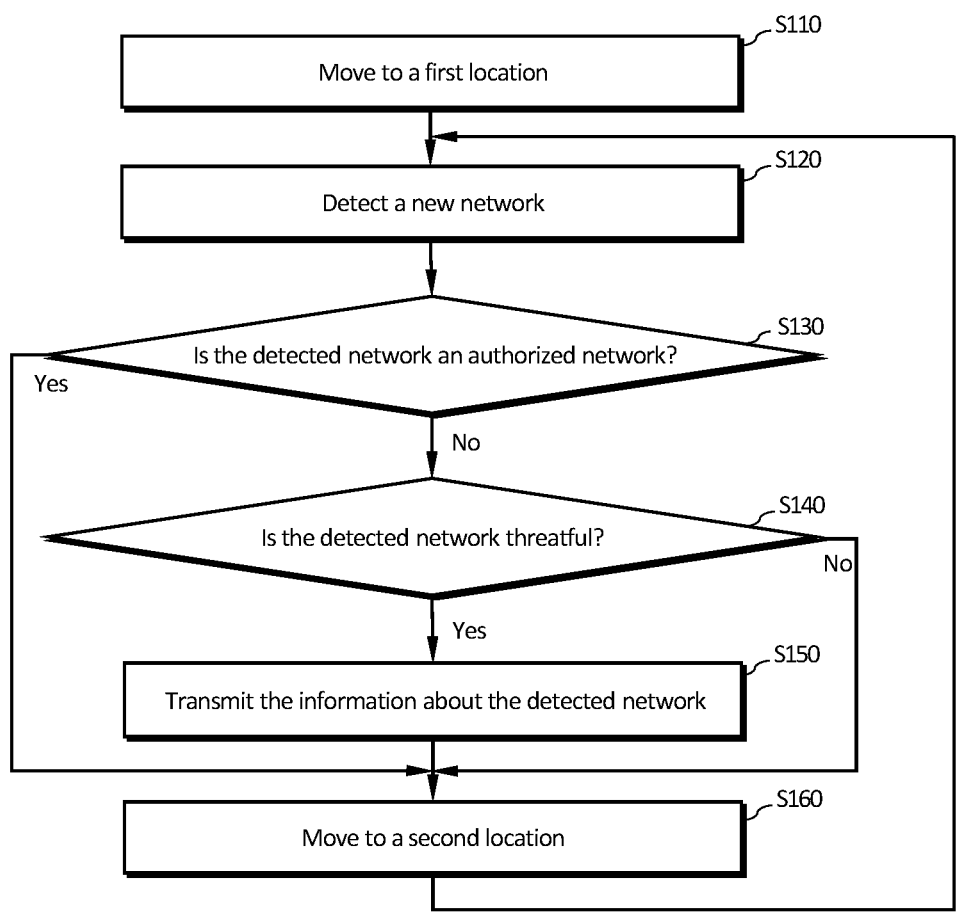
FIG. 3 is a flowchart illustrating an operating method of a mobile robot according to an exemplary embodiment.

FIG. 3 is a flowchart illustrating an operating method of a mobile robot according to an exemplary embodiment.

Referring to FIGS. 2 and 3, the mobile robot MR may move to a first location S110 to detect a new network S120. The mobile robot MR may determine whether the newly detected network is an authorized network S130. In an embodiment, the authorized network may mean a network that has been confirmed to be a safe network by a network manager.

When the newly detected network is an authorized network, the mobile robot MR may move to a second location S160 different from the first location. When the newly detected network is not an authorized network, the mobile robot MR may determine whether the detected network is a threatening network S140. In an embodiment, the mobile robot MR may determine the threat of the network based on a signal transmitted by the detected network.

When it is determined that the detected network is not threatening, the mobile robot MR may move to a second location S160 different from the first location. When it is determined that the detected network is a threat, the mobile robot MR may transmit information about the detected network to the manager S150. Although not shown, in one embodiment, the mobile robot MR may attempt to attack a detection network determined to be threatening.

According to an embodiment of the present disclosure, the mobile robot MR may determine whether a network detected while moving in a space is authorized and whether the network is threatened, and accordingly, security monitoring for a wider range beyond a range that may be monitored by a fixed device may be possible.

Figure 4:
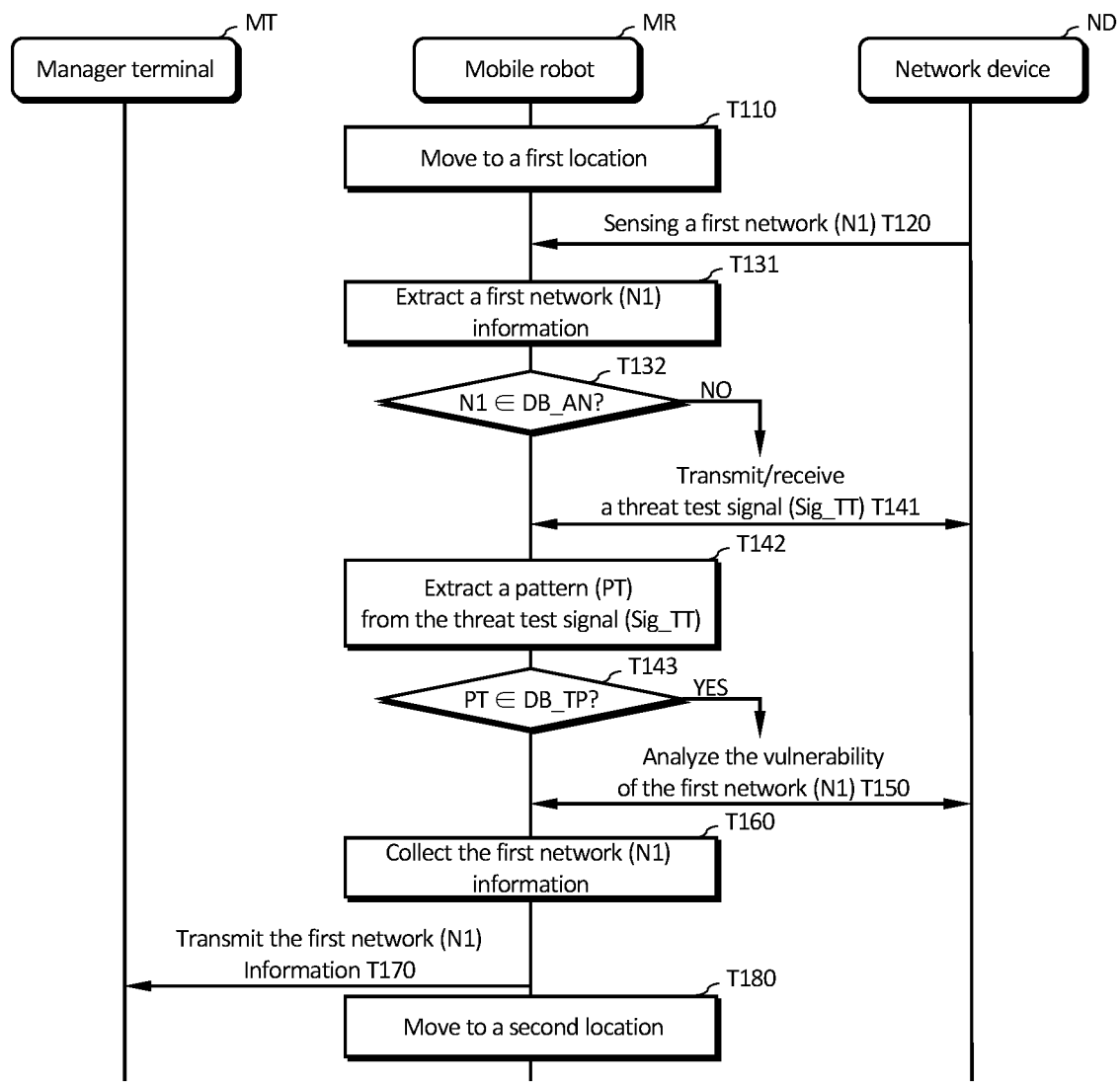
FIG. 4 is a flowchart of a method of operating a network security system, according to an exemplary embodiment.

FIG. 4 is a flowchart of a method of operating a network security system, according to an exemplary embodiment.

Referring to FIG. 4, the network security system may include a manager terminal MT, a mobile robot MR, and a network device ND. The mobile robot MR and the network device ND have been described above with reference to FIG. 1, and thus descriptions thereof will be omitted. The manager terminal MT may refer to the mobile robot MR or the terminal MT operated by a manager having an appropriate authority for a space to which the mobile robot MR belongs.

The mobile robot MR may move to the first location T110 and may detect the first network N1, which is a new network T120. The first network N1 may be a network capable of transmitting and receiving data to and from the network device ND. The mobile robot MR may extract information (e.g., a network name, a SSID, a MAC address of a network device, etc.) of the first network N1 T131, and may determine whether the first network N1 is included in the authorized network DB DB_AN based on the extracted information of the first network N1 T132.

When the first network N1 is included in the authorized network DB DB_AN, the mobile robot MR may recognize the first network N1 as a safe network and move to a second location T180, and when the first network N1 is not included in the authorized network DB DB_AN, the mobile robot MR may transmit or receive a threat test signal Sig_TT for a threat test T141.

The mobile robot MR may extract the pattern PT from the received threat test signal Sig_TT in operation T142, and may determine whether the extracted pattern PT is included in the threat pattern DB DB_TP in operation T143. In an embodiment, the threat pattern DB DB_TP may include information about data patterns found in a threat network having high aggressiveness, and may be periodically updated by an administrator or the like.

When the extracted pattern PT is not included in the threat pattern DB DB_TP, the mobile robot MR may recognize the first network N1 as a safe network and move to the second location T180, and when the extracted pattern PT is included in the threat pattern DB DB_TP, the mobile robot MR may analyze the vulnerability of the first network N1 T150, collect information about the first network N1 (for example, a network name, a SSID, a MAC address of the network device, a location of the network device, vulnerability information of the network device, etc.) based on the analyzed vulnerability information T160, and transmit the collected information about the first network N1 to the manager terminal MT T170. In addition, the mobile robot MR may complete monitoring of the first network N1 and move to the second location T180.

Although not shown in FIG. 4, in an embodiment, the mobile robot MR may disable the first network N1 by performing an attack on the first network N1 (e.g., cracking the password on the first network N1) based on the vulnerability of the first network N1.

Figure 5:
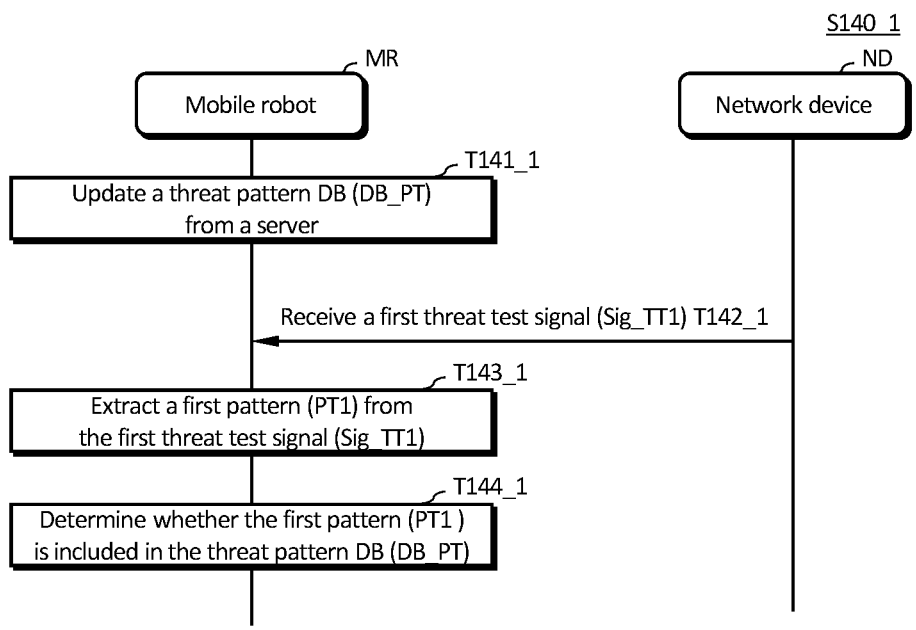
FIG. 5 is a flowchart of a method of operating a network security system, according to an exemplary embodiment.

FIG. 5 is a flowchart of a method of operating a network security system according to an exemplary embodiment. Specifically, FIG. 5 may show in detail an embodiment of the step (FIG. 3, S140, or FIGS. 4, T141 to T143) of determining, by the mobile robot MR, the threat to the network device ND, and may be referred to as a passive-type threat determination method S140_1 in the present specification.

Referring to FIG. 5, the mobile robot MR may update the threat pattern DB_TP from the server T141_1. In an embodiment, the mobile robot MR may receive a threat pattern from a predetermined source (e.g., a threat information website, a manager, etc.) through a server, and update the threat pattern DB DB_TP using the received threat pattern. The threat pattern may mean a data pattern that may be included in a threat test signal transmitted in a threatening network.

The mobile robot MR may receive the first threat test signal Sig_TT1 from the network device ND to be monitored T142_1. The mobile robot MR may extract the first pattern PT1 from the first threat test signal Sig_TT1 T143_1, and may determine whether the network device ND is a threat by determining whether the extracted first pattern PT1 is included in the threat pattern DB DB_PT T144_1. Alternatively, the mobile robot MR may determine whether the network device ND is a threat by determining whether the first threat test signal Sig_TT1 includes at least one of the threat patterns included in the threat pattern DB DB_PT. Also, the mobile robot MR may proceed with the network security sequence described in FIGS. 1 to 4 based on the determination result of the threat.

According to an exemplary embodiment of the present disclosure, the mobile robot MR may update the threat pattern and determine whether the network device ND is threatened based on the threat test signal Sig_TT1 received from the network device ND, thereby quickly and accurately determining whether the network device ND is threatened.

Figure 6:
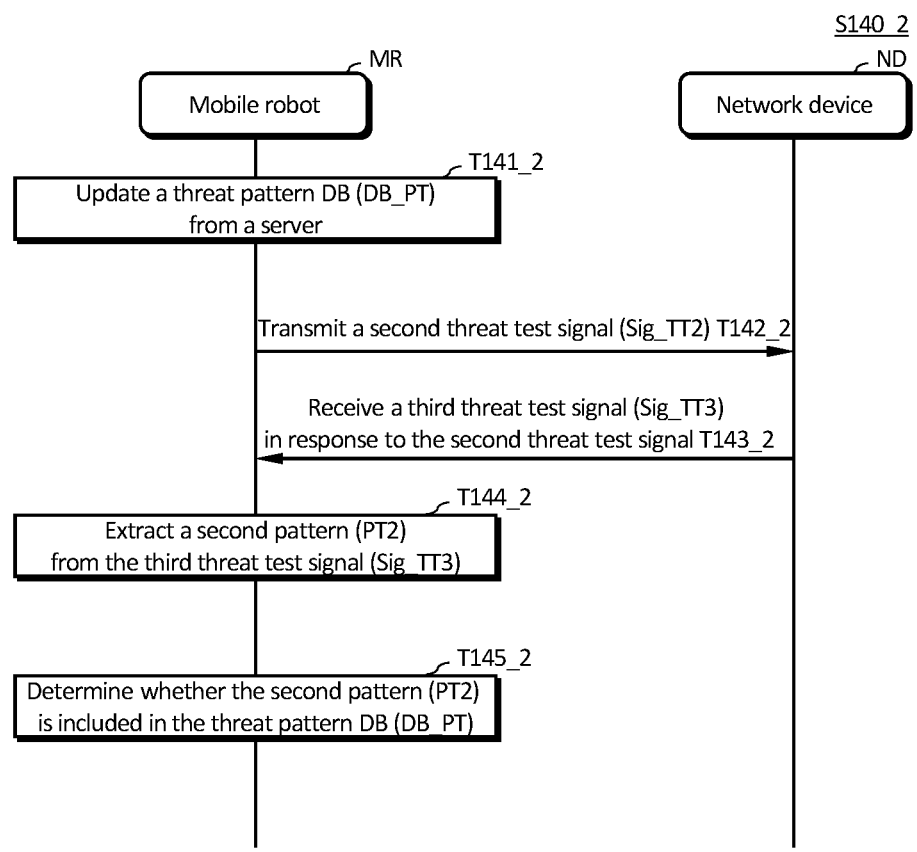
FIG. 6 is a flowchart of a method of operating a network security system, according to an exemplary embodiment.

FIG. 6 is a flowchart of a method of operating a network security system according to an exemplary embodiment. Specifically, FIG. 6 may show in detail an embodiment of the step (FIG. 3, S140 or FIGS. 4, T141 to T143) of determining, by the mobile robot MR, the threat to the network device ND, and in the present specification, it may be referred to as an active-type threat determination method S140_2.

Referring to FIG. 6, the mobile robot MR may update the threat pattern DB_TP from the server T141_2. The mobile robot MR may transmit a second threat test signal Sig_TT2 to the network device ND to be monitored for security T142_2, and may receive a third threat test signal Sig_TT3 corresponding to the second threat test signal Sig_TT2 from the network device ND T143_2. In an embodiment, the mobile robot MR may generate the second threat test signal Sig_TT1 based on the threat pattern DB DB_TP.

The mobile robot MR may extract the second pattern PT2 from the third threat test signal Sig_TT3 T144_2, and determine whether the network device ND is a threat by determining whether the extracted first pattern PT2 is included in the threat pattern DB DB_PT T145_2.

According to an exemplary embodiment of the present disclosure, the mobile robot MR may transmit a threat test signal to the network device ND and actively determine whether the network device ND is threatened based on a signal received in response to the threat test signal, thereby performing accurate determination of the threat to the network.

Figure 7:
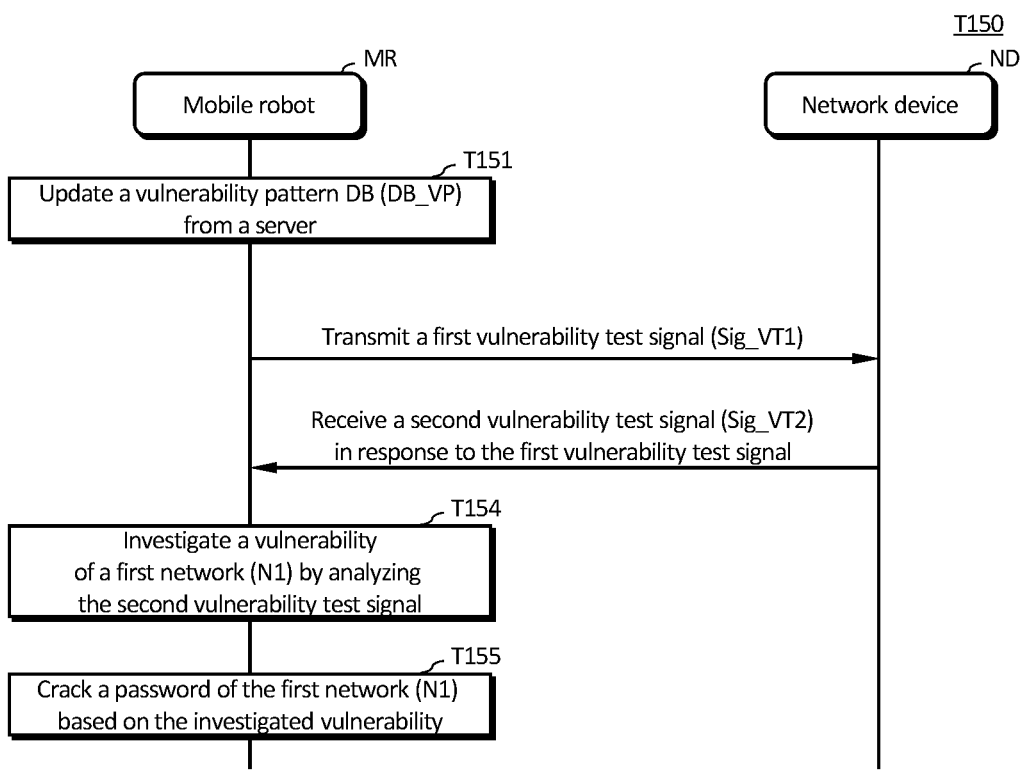
FIG. 7 is a flowchart of a method of operating a network security system, according to an exemplary embodiment.

FIG. 7 is a flowchart of a method of operating a network security system according to an exemplary embodiment. Specifically, FIG. 7 may show in detail an embodiment of a step (T150 of FIG. 4) of determining, by the mobile robot MR, a vulnerability of the network device ND.

Referring to FIG. 7, the mobile robot MR may update the vulnerability pattern DB DB_VP from the server T151. The vulnerability may refer to an inability point at which a normal operation cannot be performed in an attack on a network device, and the mobile robot MR may receive a vulnerability pattern from a predetermined source (for example, a vulnerability information website, a manager, or the like) through a server and update the vulnerability pattern DB DB_VP using the received vulnerability pattern.

The mobile robot MR may transmit a first vulnerability test signal Sig_VT1 to the network device ND to be monitored for security T152, and may receive a second vulnerability test signal Sig_VT2 corresponding to the first vulnerability test signal Sig_VT1 from the network device ND T153. In an embodiment, the mobile robot MR may generate a first vulnerability test signal Sig_VT1 based on the vulnerability pattern DB DB_VP.

The mobile robot MR may investigate the vulnerability of the first network N1 by analyzing the second vulnerability test signal Sig_VT2 T154. Also, the mobile robot MR may crack the password of the first network N1 based on the investigated vulnerability T155.

In an embodiment, the mobile robot MR may investigate not only the network device ND that transmits the first network N1 but also a vulnerability of a device connected to the access point AP when the network device ND is the access point AP.

According to an exemplary embodiment of the present disclosure, the mobile robot MR may investigate a vulnerability of the network device ND, and may crack and attack a password based on the vulnerability, thereby performing an immediate response to a threatening network.

Figure 8:
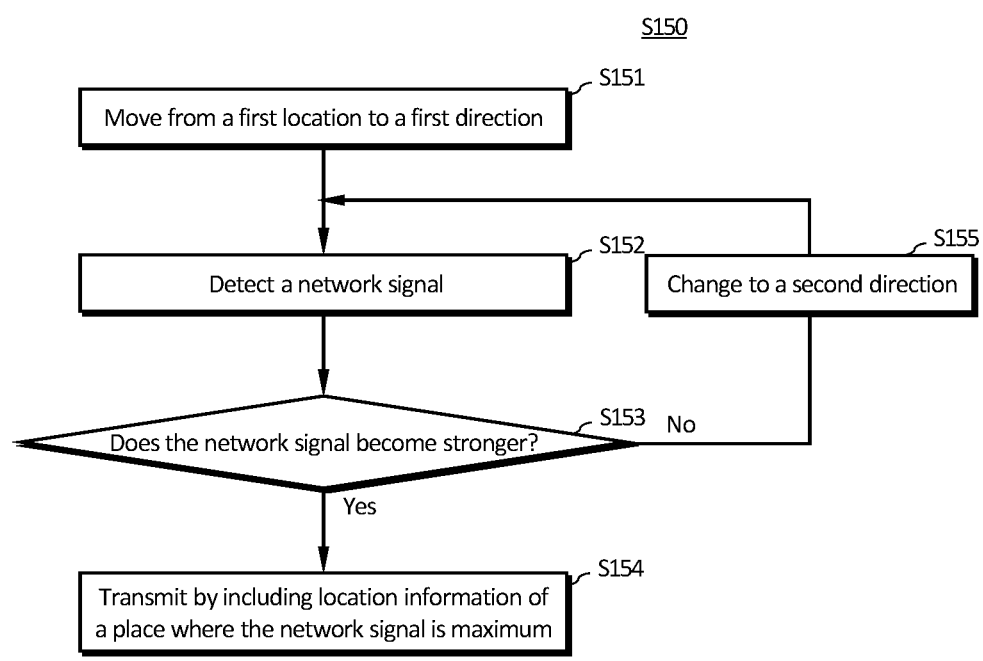
FIG. 8 is a flowchart illustrating an operating method of a mobile robot according to an exemplary embodiment.
Figure 9:
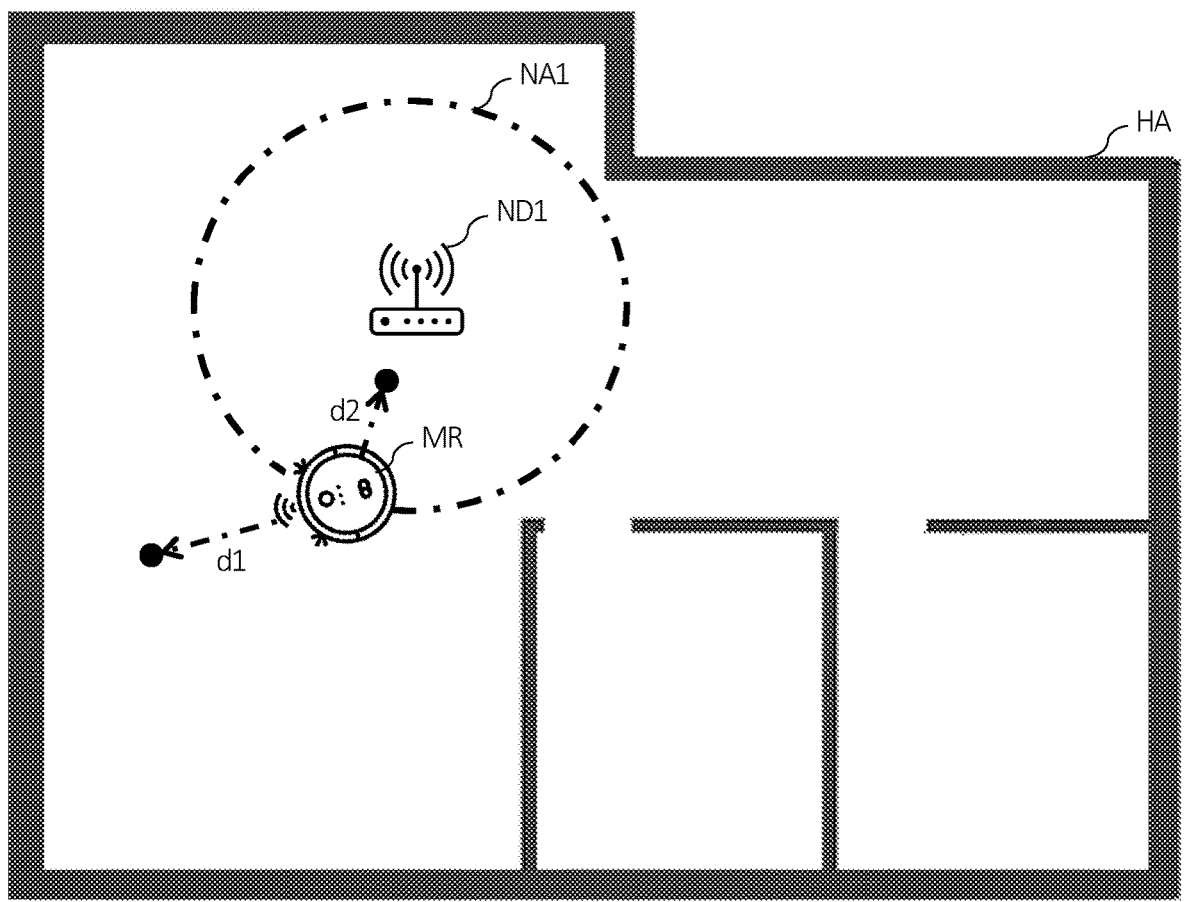
FIG. 9 is a schematic diagram illustrating a method of operating a mobile robot according to an exemplary embodiment.

FIG. 8 is a flowchart illustrating a method of operating a mobile robot according to an exemplary embodiment, and FIG. 9 is a schematic diagram illustrating a method of operating a mobile robot according to an exemplary embodiment. In detail, FIGS. 8 and 9 illustrate an embodiment of a step (S150 of FIG. 3) in which the mobile robot acquires accurate location information of the network device.

Referring to FIG. 8, when a threatening network is detected, the mobile robot MR may move in a first direction from a first location where the threatening network is detected S151. After moving in the first direction, a signal of the threatening network is detected S152, and when the signal of the threatening network becomes stronger than before S153, location information of a place where the network signal is maximum (for example, obtained from a GPS sensor of the mobile robot MR) may be included in the network information and transmitted to the manager terminal S154. When the signal of the threatening network is not stronger than the previous signal S153, the moving path may be changed to the second direction rather than the first direction S155, and the network signal may be detected again S152.

Referring to FIG. 9, when the mobile robot MR discovers the threatening first network area NA1, it is necessary to transmit the accurate location of the first network device ND1 to the manager terminal. When the mobile robot MR moves from the location where the first network area NA1 is detected in the first direction d1, the mobile robot MR becomes away from the first network device ND1, and thus the network signal intensity may be weakened. Accordingly, when the mobile robot MR changes the heading direction from the first direction d1 to the second direction d2 and proceeds, the mobile robot MR may approach the threatening first network device ND1, and accordingly, the mobile robot MR may transmit an accurate location of the threatening network device to the manager terminal. As a result, the administrator may easily remove the threatening network device by recognizing an accurate location of the threatening network device.

Figure 10:
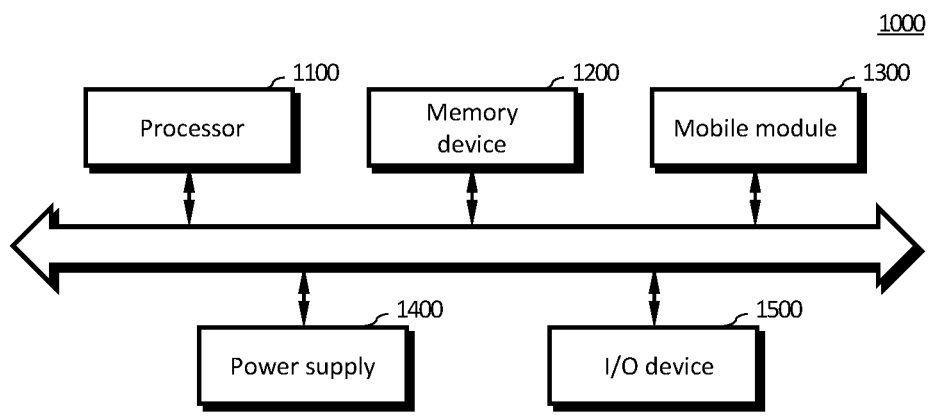
FIG. 10 is a block diagram illustrating a computing system configuring a mobile robot according to an exemplary embodiment.

FIG. 10 is a block diagram illustrating a computing system configuring a mobile robot according to an exemplary embodiment.

Referring to FIG. 10, the computing system 1000 may include a processor 1100, a memory device 1200, a mobile module 1300, a power supply 1400, and an input/output (I/O) device 1500. Meanwhile, although not illustrated in FIG. 10, the computing system 1000 may further include ports for communicating with a video card, a sound card, a memory card, a universal serial bus (USB) device, other electronic devices, etc.

As described above, the processor 1100, the memory device 1200, the mobile module 1300, the power supply 1400, and the input/output device 1500 included in the computing system 1000 may configure the mobile robot MR according to the embodiments of the inventive concept to perform a network security monitoring method. In detail, the processor 1100 may perform the method of operating the mobile robot MR described above with reference to FIGS. 1 to 9 by controlling the memory device 1200, the mobile module 1300, the power supply 1400, and the input/output device 1500.

The processor 1100 may perform specific calculations or tasks. The processor 1100 may be a micro-processor or a Central Processing Unit (CPU). The processor 1100 may communicate with the memory device 1200, the storage device 1300, and the input/output device 1500 through a bus 1600 such as an address bus, a control bus, or a data bus. According to an embodiment, the processor 1100 may also be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM and/or an MRAM. The storage device 1300 may include a solid state drive, a hard disk drive, a CD-ROM, etc. The memory device 1200 may store a program related to the spatial information processing method described above with reference to FIGS. 1 to 10. The mobile module 1300 may include a mobile means such as a motor, a wheel, or the like for moving the mobile robot MR according to a command of the processor 110.

The I/O device 1500 may include an input means such as a keyboard, a keypad, a mouse, etc., and an output means such as a printer, a display, etc. The power supply 1400 may supply an operating voltage (e.g., power for the mobile module 1300) necessary for the operation of the computing system 1000.

According to the technical idea of the present invention, by providing a mobile robot capable of determining whether a network is a threatening network while moving in a wide space and a method for operating the same, the present invention can determine whether the threatening network exists in a wider range by using the mobile robot and can minimize a shadow area in which the threatening network cannot be monitored.

Exemplary embodiments have been invented in the drawings and specifications as described above. Although embodiments have been described using specific terms in the present specification, they are used only for the purpose of describing the technical idea of the present invention and are not used to limit the meaning or limit the scope of the present invention described in the claims. Therefore, it will be understood by those of ordinary skill in the art that various modifications and other equivalent embodiments are possible therefrom. Therefore, the true technical protection scope of the present invention should be determined by the technical idea of the appended claims.

What is claimed is:

1. A method of operating a mobile robot that includes a processor and detects at least one network, the method comprising:
    moving the mobile robot to a first location by controlling a mobile module including a motor;
    detecting, by the processor, a first network at the first location;
    determining, by the processor, whether the first network is an authorized network;
    determining, by the processor, a threat of the first network when the first network is not the authorized network; and
    transmitting, by the processor, information about the first network when the first network is determined to be the threat,
    wherein the transmitting of the information about the first network comprises:
    detecting, by the processor, a signal strength of the first network;
    moving, by the processor, from the first location to a second location at which the signal strength of the first network is maximally detected by controlling the mobile module; and
    acquiring, by the processor, location information about the second location acquired using a GPS sensor as the information about the first network.

2. The method of operating the mobile robot of claim 1, wherein the determining whether the network is the authorized network comprises:
    collecting, by the processor, identification information of the first network;
    determining, by the processor, whether the identification information is included in an authorized network DB; and determining, by the processor, that the first network is not the authorized network when the identification information is not included in the authorized network DB.

3. The method of operating the mobile robot of claim 2, wherein the identification information comprises at least one of a name of the first network, a security mode, and a MAC address of a device connected to the first network.

4. The method of operating the mobile robot of claim 1, wherein the determining the threat of the first network comprises:
   receiving, by the processor, a first signal from the first network;
   determining, by the processor, whether a predetermined pattern is included in the first signal by analyzing the first signal; and
   determining, by the processor, the first network as a threat network when the predetermined pattern is included in the first signal.

5. The method of operating the mobile robot of claim 1, wherein the determining the threat of the first network comprises:
   transmitting, by the processor, a second signal to the first network;
   receiving, by the processor, a third signal from the first network in response to the second signal;
   determining, by the processor, whether a predetermined pattern is included in the third signal by analyzing the third signal; and
   determining, by the processor, the first network as a threat network when the predetermined pattern is included in the third signal.

6. The method of operating the mobile robot of claim 1, further comprising:
   investigating, by the processor, a vulnerability of the first network based on a signal received from the first network, when it is determined that the first network is a threatening network; and
   cracking, by the processor, a password of the first network based on the vulnerability.

7. The method of operating the mobile robot of claim 1, further comprising:
   investigating, by the processor, a vulnerability of an access point connected to the first network and devices connected to the access point, when it is determined by the processor that the first network is the threat network; and
   obtaining, by the processor, the vulnerability as information about the first network.

8. The method of operating the mobile robot of claim 1, further comprising:
   moving, by the processor, the mobile robot from the first location to a third location;
   detecting, by the processor, a second network at the third location;
   determining, by the processor, whether the second network is the authorized network;
   determining, by the processor, the threat of the second network when the second network is the authorized network;
   determining, by the processor, the threat of the second network when the second network is an unauthorized network; and
   acquiring, by the processor, information on the second network when the second network is determined to be a threat as a result of determining the threat.

* * * * *